United States Patent [19]

Okado et al.

[11] Patent Number: 4,646,222
[45] Date of Patent: Feb. 24, 1987

[54] INVERTER PROVIDED WITH AN OVERVOLTAGE CLAMPING CIRCUIT

[75] Inventors: Chihiro Okado; Kazushi Ichimura; Tatsuaki Ambo, all of Tokyo, Japan

[73] Assignee: Tokyo Shibaura Denki Kabushiki Kaisha, Kawasaki, Japan

[21] Appl. No.: 817,173

[22] Filed: Jan. 9, 1986

Related U.S. Application Data

[63] Continuation of Ser. No. 511,929, Jul. 8, 1983, abandoned.

[30] Foreign Application Priority Data

Jul. 15, 1982 [JP] Japan ................................. 57-123657
Aug. 4, 1982 [JP] Japan ................................. 57-136038

[51] Int. Cl.$^4$ ............................................. H02H 7/122
[52] U.S. Cl. ........................................ 363/56; 361/91; 363/132
[58] Field of Search ................... 363/56, 98, 132, 136; 361/91, 111; 318/767, 801, 811

[56] References Cited

U.S. PATENT DOCUMENTS

| | | | |
|---|---|---|---|
| 3,750,003 | 7/1973 | Petersen et al. | 363/56 |
| 3,775,663 | 11/1973 | Turnbull | 363/41 |
| 4,370,702 | 1/1983 | Shuey et al. | 363/98 |

FOREIGN PATENT DOCUMENTS

| | | | |
|---|---|---|---|
| 81901 | 5/1971 | Fed. Rep. of Germany. | |
| 1956145 | 7/1983 | Fed. Rep. of Germany. | |
| 1254711 | 11/1971 | United Kingdom | 361/111 |
| 2014805 | 8/1979 | United Kingdom | 363/56 |

OTHER PUBLICATIONS

Proceedings of the Intersociety Energy Conversion Engineering Conference, Wash. D.C., (22–26 Sep., 1969), pp. 830–838.

*Primary Examiner*—William H. Beha, Jr.
*Attorney, Agent, or Firm*—Oblon, Fisher, Spivak, McClelland & Maier

[57] ABSTRACT

Three-phase outputs of a voltage source inverter are supplied to AC input terminals of a diode bridge through reactors, respectively, and its DC outputs are clamped by a voltage of a first DC power source. The AC input terminals of the diode bridge are further connected to AC input terminals of a second diode bridge through capacitors, and its DC outputs are clamped by a second DC power source.

14 Claims, 26 Drawing Figures

INVERTER PROVIDED WITH AN OVERVOLTAGE CLAMPING CIRCUIT

This application is a Continuation of application Ser. No. 511,929, filed July 8, 1983, now abandoned.

BACKGRUND OF THE INVENTION

This invention relates to an overvoltage suppressing apparatus to be used when an output of a voltage source inverter is boosted by a transformer.

Conventionally, when an output voltage of a voltage source inverter is boosted by a transformer, a resonance voltage on the order of tens of kilohertz is caused due to the leakage inductance of the transformer and the leakage capacitances of a load cable and a load AC motor. Since an output voltage of a voltage source inverter changes step by step, in an extreme case a voltage oscillation which is twice the step-like output change may be caused. This phenomenon will be described with respect to an example of a conventional circuit shown in FIGS. 1A and 1B.

Figure 1A:
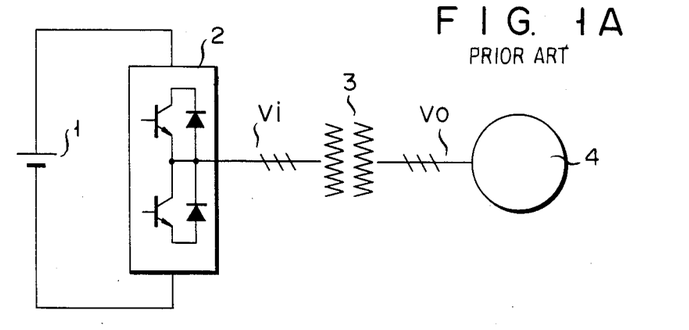
FIGS. 1A and 1B show a block diagram and an equivalent circuit diagram, respectively, of a motor driving circuit using a conventional voltage source inverter.

In a circuit shown in FIG. 1A, an AC output of a rectangular wave is obtained from an output terminal of a voltage source inverter 2 to be driven by a DC power source 1, and this AC output is boosted by a transformer 3 to drive an AC motor 4. As shown in FIG. 1A, the voltage source inverter 2 consists of, for example, a transistor inverter, and its rectangular wave output voltage $V_i$ is boosted to a high voltage output $V_0$ by the transformer 3.

Figure 1B:
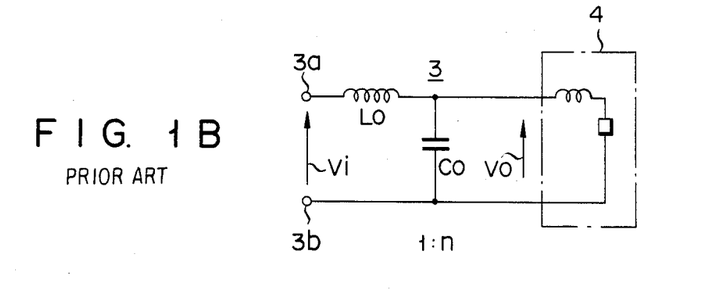

FIG. 1B shows an equivalent circuit of the circuit shown in FIG. 1A. In FIG. 1B, a reference character n represents a turn ratio of the transformer 3, and the input voltage $V_i$ is applied across input terminals 3a and 3b of the transformer 3, respectively. This transformer 3 is indicated by a leakage inductance $L_0$ connected between one input terminal 3a and one input terminal of the AC motor 4 and by a leakage capacitance $C_0$ connected between the input terminals of the AC motor 4. The leakage capacitance $C_0$ includes a leakage capacitance of the load AC motor 4.

Figure 2A:
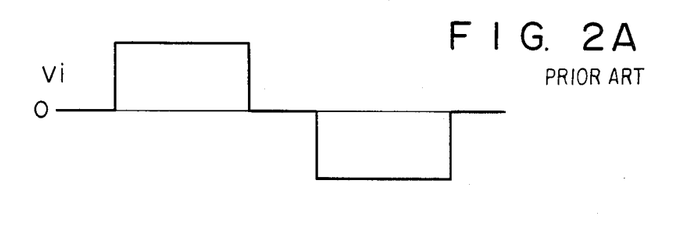
FIGS. 2A and 2B show voltage waveforms to describe the operation of the equivalent circuit shown in FIG. 1B.
Figure 2B:
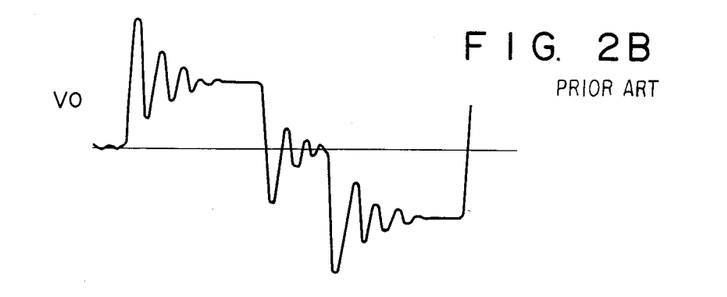
Figure 3:
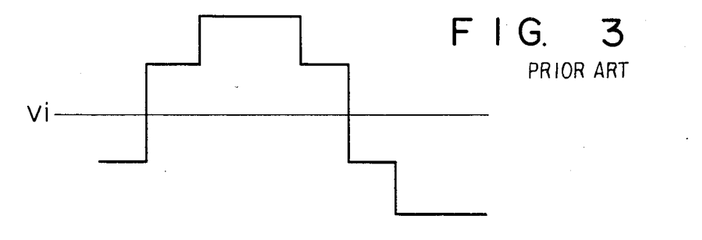
FIG. 3 shows an output waveform of a multiplexing type inverter.

When the step-like inverter output voltage $V_i$ as shown in FIG. 2A is applied across the input terminals 3a and 3b of the equivalent circuit shown in FIG. 1B, a resonance oscillating voltage is caused by the reactance elements $L_0$ and $C_0$, so that the boosted voltage $V_0$ oscillates with the leading and trailing edges of the input rectangular wave $V_i$ as shown in FIG. 2B. A peak value of the oscillating voltage to be added to the output voltage $V_0$ reaches twice the normal output voltage $V_0 = n \cdot V_i$, causing rapid degradation of the insulating properties of the transformer 3 and the AC motor 4. In general, degradation of the insulating property of electric equipment occurs when a surge voltage which exceeds 1.2 times the rated voltage is applied frequently. Therefore, it is preferable to suppress the peak value of such an oscillating voltage to 1.2 times the rated voltage or less. A conventional method, as shown in FIG. 3, is known as one of the suppressing methods by which the voltage source inverter 2 is multiplexed to diminish the step width of the input voltage $V_i$ of the transformer 3.

However, this multiplexing of the voltage source inverter causes an excessive complication of the principal circuit of the inverter and a high production cost; therefore, this method is unsuitable for an inverter with a relatively small capacity. Furthermore, in this method, there may be a case where the step-like leading phase of the input voltage of one inverter among the multiplexing inverters coincides with the phase of the resonance voltage of an inverter at the former stage. In such a case, the amplitude of the output of the former one inverter becomes too large. This negates the purpose of multiplexing the inverter.

A pulse width modulation (PWM) inverter may also be used as an inverter. However, in this case, the change amount of the input voltage to the PWM inverter is fixed, so that the multiplexing of the inverter to obtain the output as shown in FIG. 3 is impossible.

SUMMARY OF THE INVENTION

It is an object of this invention to provide an overvoltage suppressing apparatus wherein the secondary oscillating voltage of the boosting transformer can be suppressed independently of the output voltage waveform of the voltage source inverter.

According to the present invention, this object is accomplished by the provision of an overvoltage suppressing apparatus comprising: at least one reactor having an input terminal connected to an output terminal of a voltage source inverter and an output terminal connected to the primary side of a boosting transformer; a clamping circuit for clamping an output voltage of the reactor; and at least one capacitor having one end connected to the output terminal of the reactor.

BRIEF DESCRIPTION OF THE DRAWINGS

FIGS. 16 and 17 show circuit diagrams in still different embodiments of this invention.

DETAILED DESCRIPTION OF THE PREFERRED EMBODIMENTS

Figure 4:
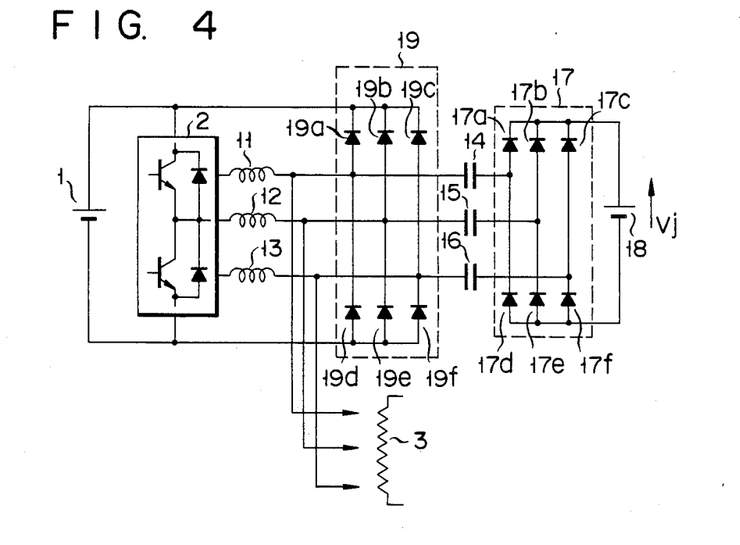
FIG. 4 shows a circuit diagram of an embodiment of this invention.

The preferred embodiments of this invention will be described in detail hereinafter with reference to the accompanying drawings. In FIG. 4, a DC power source 1 is connected at its output terminals across DC input terminals of a voltage source inverter 2. Three-phase AC output terminals of the voltage source inverter 2 are connected to one end of each of the reactors 11, 12 and 13. Each of the other ends of the reactors 11 to 13 is connected to the primary side of a boosting transformer 3. The secondary side thereof is connected to a load (not shown), for example, a high voltage AC motor.

Each of the other ends of the reactors 11 to 13 is also connected to one end of each of the capacitors 14, 15 and 16, respectively. The other ends of the capacitors 14 to 16 are connected to AC input terminals of a diode bridge 17 consisting of six diodes 17a, 17b, 17c, 17d, 17e, and 17f. This diode bridge 17 constitutes a full-wave rectifying circuit of the three-phases, and a DC power source 18 is connected across the DC output terminals of this diode bridge 17 to apply a DC voltage $V_j$ in the opposite direction.

The other ends of the reactors 11 to 13 are further connected to AC input terminals of a three-phase full-wave rectifying circuit 19 consisting of six diodes 19a to 19f. Its DC output terminals are oppositely connected to the DC power source 1.

Figure 5:
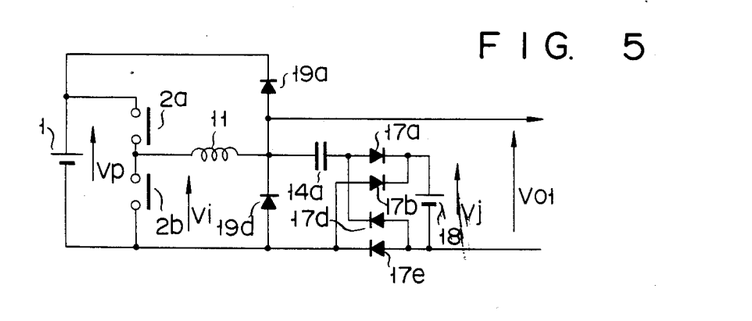
FIG. 5 is an equivalent circuit diagram with respect to one phase of the circuit shown in FIG. 4.

The operation of the circuit in an embodiment shown in FIG. 4 will now be described with reference to an equivalent circuit of one phase of the circuit in FIG. 5. This equivalent circuit is shown in FIG. 5, wherein the voltage source inverter 2 is indicated by a pair of switches 2a and 2b. One end of the reactor 11 is connected to the connecting point of these switches 2a and 2b. A capacitor 14a represents an equivalent capacitor including the capacitor 14.

Figure 6A:
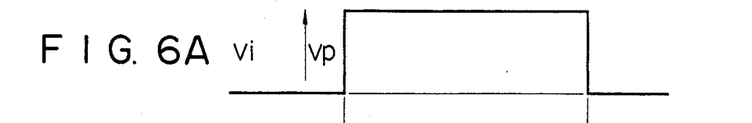
FIGS. 6A and 6B show voltage waveform drawings to describe the operation of the circuit shown in FIG. 4.
Figure 6B:
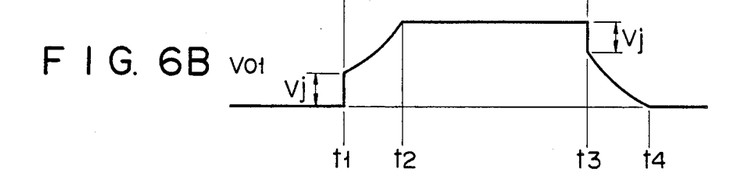

Now, it is assumed that the step-like voltage $V_i$ shown in FIG. 6A is obtained as an output of one phase of the inverter 2 by a series of ON/OFF operations of the switches 2a and 2b. That is, assuming that the switch 2a is closed and the switch 2b is opened at time $t_1$, a voltage $V_p$ of the DC power source 1 is applied to one end of the reactor 11. At this time, a resonance circuit is formed by the reactor 11 and the capacitor 14a. The diodes 17a and 17e are turned on, so that the voltage $V_{01}$ at the output terminal of the reactor 11 jumps by only the voltage $V_j$ of the DC power source 18 at time $t_1$ as shown in FIG. 6B. Thereafter, the voltage $V_{01}$ gradually increases until time $t_2$ in compliance with the voltage to be generated by the resonance circuit consisting of the reactor 11 and the capacitor 14a.

From the time that the voltage $V_{01}$ becomes equal to the power voltage $V_p$ (at time $t_2$), the voltage $V_{01}$ will be clamped through the diode 19a, so that no overvoltage will be caused from the resonance circuit. Therefore, a voltage higher than the rated voltage is not applied to the primary side of the boosting transformer 3.

When the switch 2a is opened and the switch 2b is closed at time $t_3$, the charge stored in the capacitor 14a flows through the reactor 11 and the diodes 17b and 17d. At this time, the resonance current flows opposite to the flow at time $t_1$, so that the output voltage $V_{01}$ jumps by only the voltage $-V_j$ as shown in FIG. 6B. After time $t_3$, no undershooting will be caused due to the operation of the diode 19d.

The output with the voltage waveform $V_{01}$ as shown in FIG. 6B is supplied as an output of the inverter 2 to the primary side of the boosting transformer 3. Therefore, a proper selection of the resonance frequency of the reactor 11 and the capacitor 14a and the jump voltage $V_j$ allows the overvoltage at the load terminal, i.e., the connecting point on the primary side of the reactor 11 and the boosting transformer 3, to be suppressed to almost zero. In other words, the oscillation due to the step-like voltage at time $t_1$ and the exciting waveform from time $t_1$ to $t_2$ act so that their phases are opposite to each other; thus, the oscillation disappears at time $t_2$. When the voltage with the waveform shown in FIG. 6B is supplied to the boosting transformer 3, $$V_j = \tfrac{1}{3} V_p, \quad LC = 9 L_0 C_0$$

wherein, L indicates an inductance of the reactor 11 and C denotes a capacitance of the capacitor 14a, may be selected to minimize the oscillating voltage. Reference characters $L_0$ and $C_0$ have already been described previously with respect to FIG. 1B.

Figure 7A:
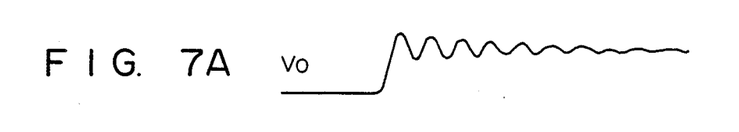
FIGS. 7A to 7F are voltage waveforms showing the effects of an overvoltage suppressing apparatus of this invention in comparison with conventional ones.
Figure 7B:
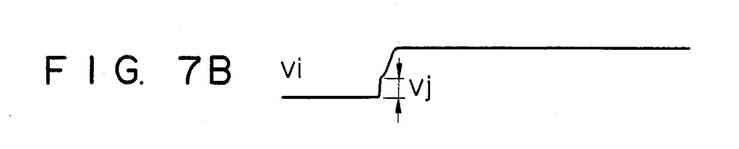
Figure 7C:
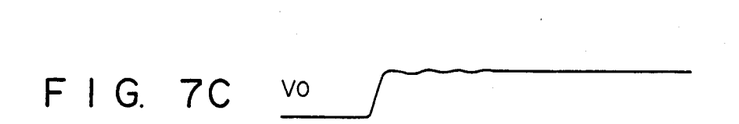

The effect of the present invention will be described in comparison to the prior art with reference to FIGS. 7A to 7F. FIG. 7A shows a waveform drawing of the output voltage $V_0$ of the transformer 3 to be supplied to the motor 4 shown in FIG. 1A, wherein an oscillating voltage with large amplitudes is caused. FIG. 7B shows the inverter output voltage $V_i$ when $V_j = \tfrac{1}{3} V_p$ and $LC = 9 L_0 C_0$ in the equivalent circuit in FIG. 5. In this case, the output voltage $V_0$ on the secondary or high voltage side of the boosting transformer 3 shows a voltage waveform which includes almost no oscillating components, as shown in FIG. 7C.

Figure 7D:
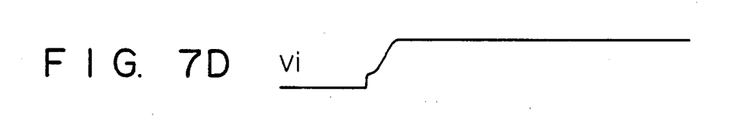
Figure 7E:
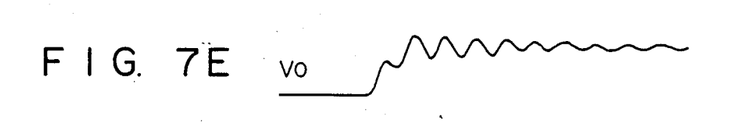
Figure 7F:
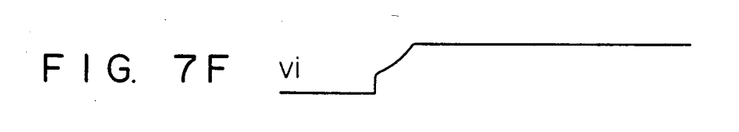

FIG. 7D shows a waveform drawing of the inverter output voltage $V_i$ when $LC > 9 L_0 C_0$. In this case, the waveform of the output voltage $V_0$ of the transformer 3 includes small oscillating components as shown in FIG. 7E. However, the peak value of the oscillating components at this time is approximately 30 percent larger than the rated voltage, and it is obviously less than in the prior art.

In an embodiment in FIG. 4, the single DC power source 1 is commonly used as the DC power source for driving the voltage source inverter 2 and as the DC power source to be connected across the DC output terminals of the full-wave rectifying circuit 19 which constitutes the clamping circuit; however, another DC power source may be provided separately for such a clamping circuit.

Figure 8:
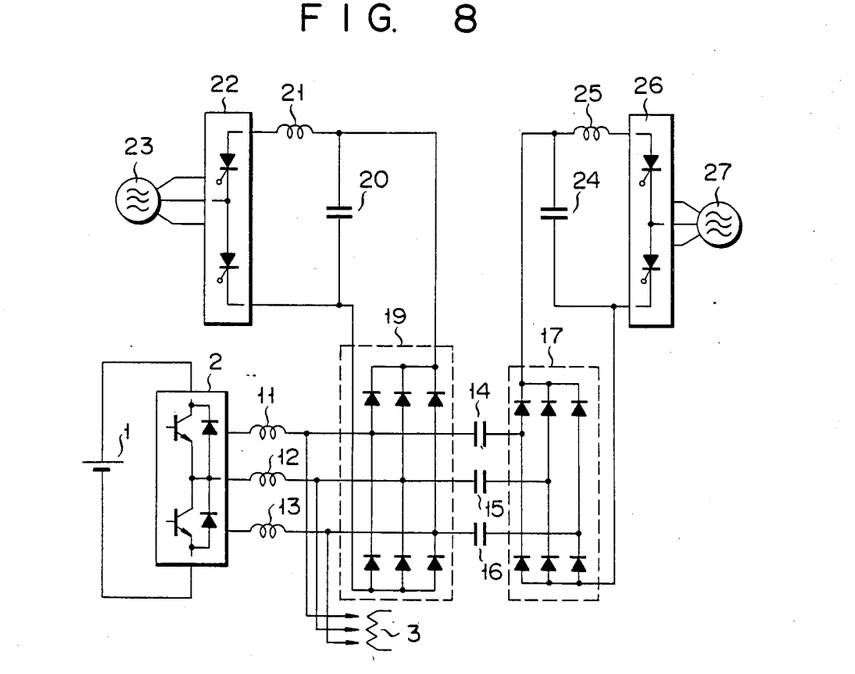
FIGS. 8 and 9 show circuit diagrams in different embodiments of this invention.

FIG. 8 shows another embodiment as an example for that case, wherein the same parts and components as shown in the first embodiment in FIG. 4 are designated by the same reference numerals. In FIG. 8, the output terminals on the positive side of the full-wave rectifying circuit 19 are connected to the connecting point of a smoothing capacitor 20 and a reactor 21. The capacitor 20 is connected to the DC output terminals of the full-wave rectifying circuit 19. The other end of the reactor 21 and the output terminals on the negative side of the full-wave rectifying circuit 19 are connected across DC output terminals of a thyristor bridge circuit 22, respectively. The three-phase AC input terminals of this thyristor bridge circuit 22 are connected to a three-phase AC power source 23. In this way, the DC power source 1 is replaced by a constant-voltage DC power source consisting of the thyristor bridge circuit 22, reactor 21 and smoothing capacitor 20 in the embodiment shown in FIG. 8.

In this embodiment of FIG. 8, a constant-voltage DC power source using a thyristor bridge is further used in place of the power source 18 for applying the voltage $V_j$. Namely, a smoothing capacitor 24 is connected between the DC output terminals of the full-wave rectifying circuit 17, and the positive side terminals of the above-mentioned output terminals are connected to an output terminal on the negative side of a thyristor bridge 26 through a reactor 25. An output terminal on the positive side of this thyristor bridge 26 is connected to the output terminals on the negative side of the full-wave rectifying circuit 17. AC input terminals of the thyristor bridge 26 are connected to a three-phase AC power source 27.

The operation of the circuit shown in the embodiment of FIG. 8 will be similar to the operation of the embodiment of FIG. 4 provided the circuit is constituted such that the voltages corresponding to the output voltages of the DC power sources 1 and 18 are obtained across the terminals of the smoothing capacitors 20 and 24, respectively; therefore, any further detailed description will be omitted herein. Either the same type or different types of three-phase AC power sources 23 and 27 may be used.

Figure 9:
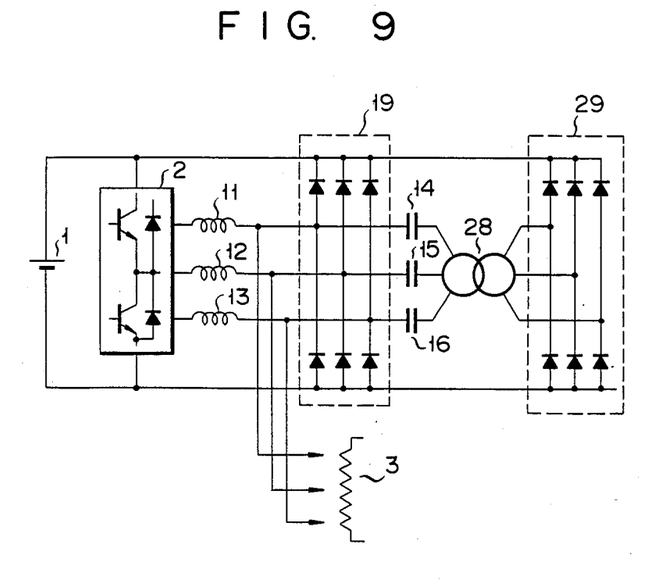

In an embodiment shown in FIG. 9, each one end of the capacitors 14, 15 and 16 is connected to the primary side of a three-phase transformer 28 and output voltages on the secondary side are rectified by a three-phase full-wave rectifying circuit 29 to obtain a DC output voltage across its DC output terminals. Although the jump voltage $V_j$ is obtained from the DC power source 18 in the embodiment shown in FIG. 4, the jump voltage $V_j$ is determined by a transformation ratio of the transformer 28 in the embodiment in FIG. 9. The DC output terminals of the rectifier 29 are commonly connected to the DC power source 1 together with the rectifying circuit 19.

Figure 10:
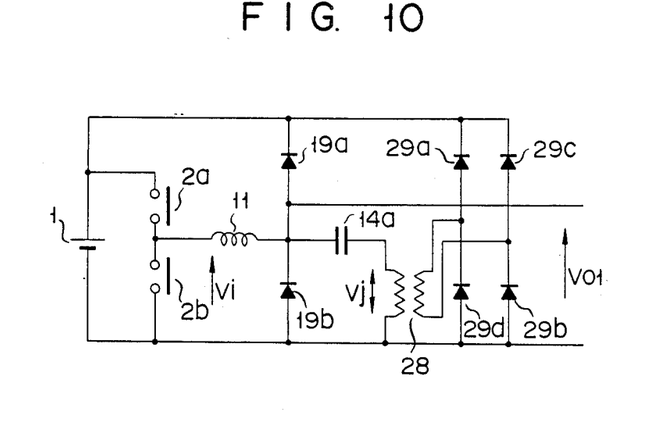
FIG. 10 shows an equivalent circuit diagram with respect to one phase of the circuit shown in FIG. 9.

A partial equivalent circuit of one phase of the circuit shown in FIG. 9 is illustrated in FIG. 10. When the switch 2a of the inverter 2 is closed and the switch 2b is opened, the input voltage $V_1$ shown in FIG. 6A is applied to the input terminal of the reactor 11. The jump voltage $V_j$ appears across the primary terminals of the transformer 28 at the leading edge of the voltage $V_i$ at the time $t_1$ and the output voltage $V_{01}$ jumps by only $V_j$ as shown in FIG. 6B; thereafter, the voltage gradually increases by the reactor 11 and the capacitor 14a. The voltage $V_{01}$ also changes, as shown in FIG. 6B, at the trailing edge at time $t_3$. Diodes 29a to 29d shown in FIG. 10 operate with respect to predetermined phase of the rectifier 29.

In each of the above-described embodiments, the output voltage $V_{01}$ of the reactor jumps by only $V_j$ at the switching time of the inverter as shown in FIG. 6B. Even if this jump voltage $V_j$ is zero, the oscillation suppressing characteristic, i.e. the damping characteristic will become slightly worse. However, if the inductance of the reactor and the capacitance of the capacitor are suitably selected, the overshooting on the load side of the transformer 3 can be adequately suppressed. Embodiments of such a case are shown in FIGS. 11 and 12.

Figure 11:
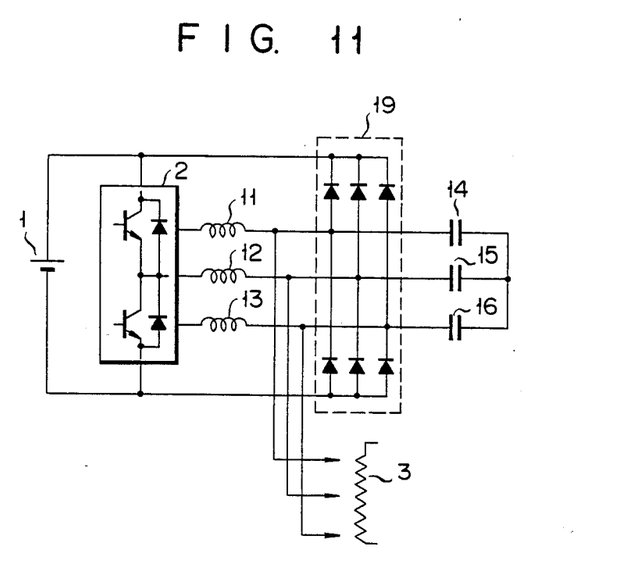
FIGS. 11 and 12 show circuit diagrams in further different embodiments of this invention.

In the embodiment shown in FIG. 11, each one end of the capacitors 14, 15 and 16 is connected to the reactors 11, 12 and 13, respectively, and the other ends are commonly connected, thereby setting $V_j$ to a zero potential. In this embodiment, the DC voltage power surce for clamping the voltage is set at the DC power source 1 in the same manner as the embodiments shown in FIGS. 4 and 9.

Figure 12:
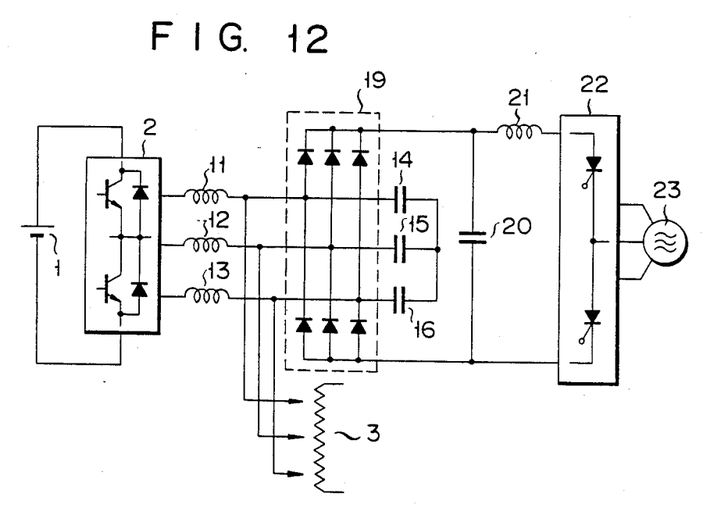

In an embodiment shown in FIG. 12, the other ends of the capacitors 14, 15 and 16 are commonly connected as in the example of FIG. 11, but the DC voltage for clamping is obtained from a constant-voltage power source consisting of the smoothing capacitor 20, reactor 21, thyristor bridge 22, and AC power source 23 without using the DC power source 1. Although the capacitors 14, 15 and 16 are Y-connected in FIGS. 11 and 12, they may be Δ-connected.

As described above, since the present invention uses the reactors and capacitors, very little power loss is caused and the output oscillation on the high voltage side of the boosting transformer can be effectively suppressed.

In each of the above-mentioned embodiments, the output of the boosting transformer is taken out of the output terminals of the reactors 11, 12 and 13; however, the reactors with taps may be used to obtain the output from these taps.

Figure 13:
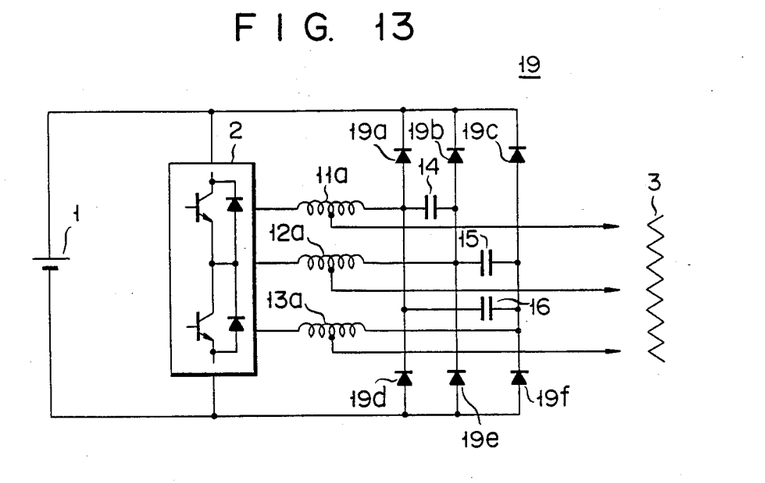
FIGS. 13 and 14 show a circuit diagram and its equivalent circuit diagram, respectively, in still another embodiment of this invention.

FIG. 13 shows an embodiment of such a case, in which an output of each phase of the voltage source inverter 2 is connected to each one end of reactors 11a, 12a and 13a. These reactors 11a, 12a and 13a are provided with taps, respectively. These taps are connected to the primary side of the boosting transformer 3. Each of the other ends of the reactors 11a to 13a is connected to the AC input terminals of the three-phase full-wave rectifying circuit 19 consisting of the diodes 19a to 19f, respectively. The DC output terminals of this rectifying circuit 19 are connected to the DC power source 1. The three capacitors 14, 15 and 16 are connected between each base on the three-phase phase input sides of the rectifying circuit 19.

Figure 14:
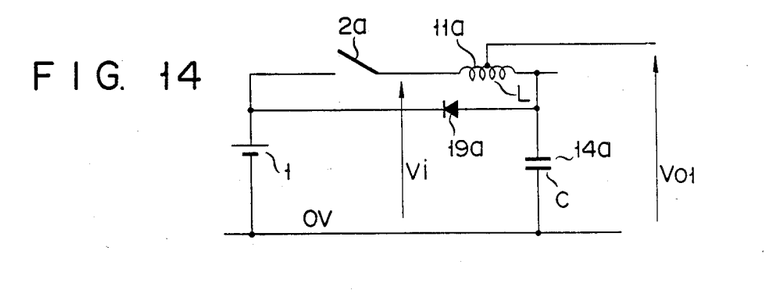

FIG. 14 shows an equivalent circuit of one phase of the circuit shown in FIG. 15. In this circuit, one switch element of the inverter 2 is indicated by a reference numeral 2a, and 14a represents the capacitor whose capacitor 14 is transformed for a single-phase circuit.

Figure 15A:
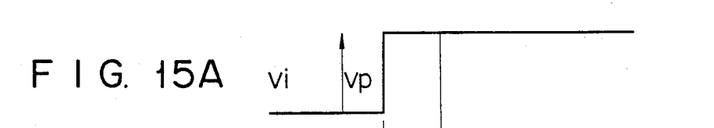
FIGS. 15A and 15B show voltage waveforms to describe the operation of the equivalent circuit shown in FIG. 14.
Figure 15B:
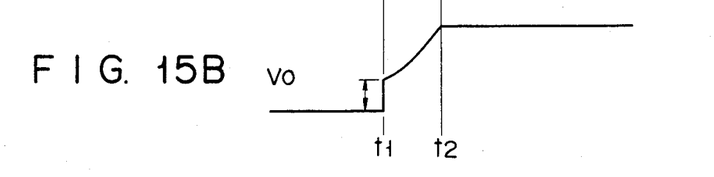

The operation of the equivalent circuit in FIG. 14 is described below with reference to FIGS. 15A and 15B. Now, it is assumed that the switch 2a is turned on at time $t_1$ as shown in FIG. 15A and the input voltage $V_i$ of the reactor 11a rises to $V_p$. The output voltage $V_{01}$ to be obtained from the tap of the reactor 11a is a total voltage combining the terminal voltage of the capacitor 14a and the voltage drop from the tap of the reactor 11a to the terminal on the capacitor 14a. The phase of the voltage drop of the reactor 11a is opposite to that of the terminal voltage of the capacitor 14a, so that the voltage $V_{01}$ jumps by only the voltage drop $V_j$ of the reactor 11a at time $t_1$, as shown in FIG. 15B. Then, the voltage gradually increases until time $t_2$ in accordance with the resonance waveform to be determined by the reactor 11a and the capacitor 14a until it equals $V_i$ at time $t_2$. Thereafter, no overvoltage will be caused in the input to the boosting transformer 3 because it is clamped by the voltage of the DC power source 1 through the diode 17a.

A relation of $V_j = \frac{1}{3} V_p$ must be satisfied in order to minimize the oscillating voltage to be input to the boosting transformer 3. For this purpose, the tap of the reactor 11a may be taken out by a $\frac{2}{3}$ turn from its input side and connected to the input side of the boosting transformer 3. In this way, when the tap is connected to a load by a $\frac{2}{3}$ turn, the impedance of the reactor 11a from the load side is proportional to the square of the number of turns. The voltage drop due to the load current is 4/9 as compared with the case where no intermediate tap of the reactor 11a is used, so that the reactive power is reduced. If 20 to 30% oscillating voltage is permitted, the tap of the reactor 11a may also be taken out of the location at a turn ratio of $\frac{1}{2}$. The voltage drop in this case becomes $\frac{1}{4}$, so that the reactive power is further reduced.

When $V_j = \frac{1}{3}V_p$ and $LC \approx 9L_0C_0$, the output voltage $V_{01}$ is as shown in FIG. 7B; namely, there is hardly any oscillating voltage in the output of the boosting transformer 3 at this time as shown in FIG. 7C.

As shown in FIG. 16, each one end of the capacitors 14 to 16 is connected to each one terminal of the reactors 11a to 13a with taps and the other ends may be commonly Y-connected. In this embodiment shown in FIG. 16, the tap outputs of the reactors 11a to 13a are coupled to the AC input terminals of the diode bridge 19 and also to the primary side of the boosting transformer 3. With such a structure, the overvoltage can be similarly suppressed.

Although the DC output of the diode bridge 19 is clamped by the DC power source 1 in the embodiment in FIG. 16, it may also be possible as shown in FIG. 17 to clamp the DC output of the bridge 19 by a constant-voltage power source consisting of the smoothing capacitor 20, reactor 21, thyristor bridge 22, and AC power source 23, like the embodiments of FIG. 8 and FIG. 12.

As described above, since the load current is obtained from the taps of the reactors, the voltage drop due to the inductance is reduced, thereby efficiently suppressing the oscillation.

What is claimed is:

1. An overvoltage suppressing apparatus, comprising:
   a voltage source inverter having switching transistors, recirculating diodes connected across current paths of the switching transistors, and an output terminal;
   at least one reactor having an input terminal connected to the output terminal of said voltage source inverter and an output terminal to be connected to the primary side of a boosting transformer;
   a clamping circuit including a diode for clamping an output voltage at the output terminal of said reactor to a first predetermined potential so that a potential on said output terminal of said reactor does not exceed said first predetermined potential; and
   at least one capacitor having one end connected to the output terminal of said reactor and another end coupled to a second predetermined potential, said capacitor and said reactor forming a resonant circuit which limits changes in potential between said first and second predetermined potentials on said output terminal to a resonance curve defined by said resonant circuit.

2. An overvoltage suppressing apparatus according to claim 1, including plural reactors, wherein said input and output terminals of said reactors are formed at each one end and each of the other ends of said reactors, respectively.

3. An overvoltage suppressing apparatus, comprising:
   a DC power source;
   a three-phase voltage source inverter having DC power input terminals connected to the DC power source and having three output terminals;
   three reactors having input terminals connected to respective of the output terminals of the voltage source inverter and taps provided as output terminals for connection to the primary side of a boosting transformer;
   a clamping circuit including three diodes for clamping the three output terminals of said reactors to a first predetermined potential so that the respective potentials on said output terminals of said reactors do not exceed said first predetermined potential; and
   three capacitors each having one end connected to one of the output terminals of said reactors and another end coupled to a second predetermined potential, said capacitors and said reactors forming resonant circuits which limit changes in potential between said first and second predetermined potentials of said output terminals to a resonance curve defined by said resonant circuits.

4. An overvoltage suppressing apparatus according to claim 3, comprising:
   a diode bridge having AC input terminals connected to respective of said another ends of said capacitors and DC output terminals connected to a second DC power source.

5. An overvoltage suppressing apparatus according to claim 4, wherein said second DC power source is a constant-voltage DC power source including: a three-phase AC power source; a rectifying circuit for rectifying an output voltage of said three-phase AC power source; and a smoothing reactor and a smoothing capacitor for smoothing a rectified output of said rectifying circuit.

6. An overvoltage suppressing apparatus according to claim 3, comprising:
   a transformer having a primary winding and a secondary winding, said primary winding connected to said another ends of said capacitors, and
   a three-phase diode bridge having AC input terminals connected to said secondary winding.

7. An overvoltage suppressing apparatus according to claim 3, wherein said clamping circuit includes a three-phase diode bridge having AC input terminals connected to the other ends of said reactors and DC output terminals connected to said DC power source, and wherein said capacitors each have one end connected to the other end of a respective of said reactors and the other end thereof connected to an adjacent AC terminal of a three-phase diode bridge connected to an AC power source.

8. An overvoltage suppressing apparatus according to claim 3, wherein said clamping circuit includes a three-phase diode bridge having AC input terminals connected to said taps and DC output terminals connected to said DC power source, and wherein said capacitors are three-phase connecting capacitors each having one end connected to the other end of a respective of said reactors, the other ends of said capacitor being Y-connected.

9. An overvoltage suppressing apparatus according to claim 8, wherein said second DC power source includes: a three-phase AC power source; a rectifying circuit for rectifying an output voltage of said three-phase AC power source; and a smoothing reactor and a smoothing capacitor for smoothing a rectified output of said rectifying circuit, a terminal of said smoothing capacitor being connected to the DC output terminal of said three-phase diode bridge.

10. An overvoltage suppressing apparatus, comprising:
    a first DC power source;
    a three-phase voltage source inverter having DC power input terminals connected to the first DC power source and having three output terminals;
    three reactors having input terminals connected to respective of the output terminals of the voltage source inverter and output terminals for connection to the primary side of a boosting transformer;

a clamping circuit including three diodes for clamping the three output terminals of said reactors to a predetermined potential so that the respective potentials on said output terminals of said reactors do not exceed said predetermined potential; and three capacitors having one end connected to respective of the output terminals of said reactors and another end commonly interconnected to each other, said capacitors and said reactors forming resonant circuits which limit potential changes at the reactor output terminals to a resonance curve defined by said resonant circuits.

11. An overvoltage suppressing apparatus according to claim 10, wherein said clamping circuit includes a three-phase diode bridge having AC input terminals connected to the other ends of said reactors and DC output terminals connected to a second DC power source at said predetermined potential.

12. An overvoltage suppressing apparatus according to claim 11, wherein said second DC power source is also used as the DC power source for said voltage source inverter.

13. An overvoltage suppressing apparatus according to claim 12, wherein the other ends of said capacitors 14. An overvoltage suppressing apparatus according to claim 11, wherein said second DC power source includes: a three-phase AC power source; a rectifying circit for rectifying an output voltage of said three-phase AC power source; and a smoothing reactor and a smoothing capacitor for smoothing a rectified output of said rectifying circuit, a terminal of said smoothing capacitor being connected to the DC output terminal of said three-phase diode bridge.

* * * * *